June 25, 1940. P. E. KLEINEBERG ET AL Re. 21,489
SHEET OR SIGNATURE FEEDING AND GATHERING
Original Filed Aug. 12, 1937 5 Sheets-Sheet 1
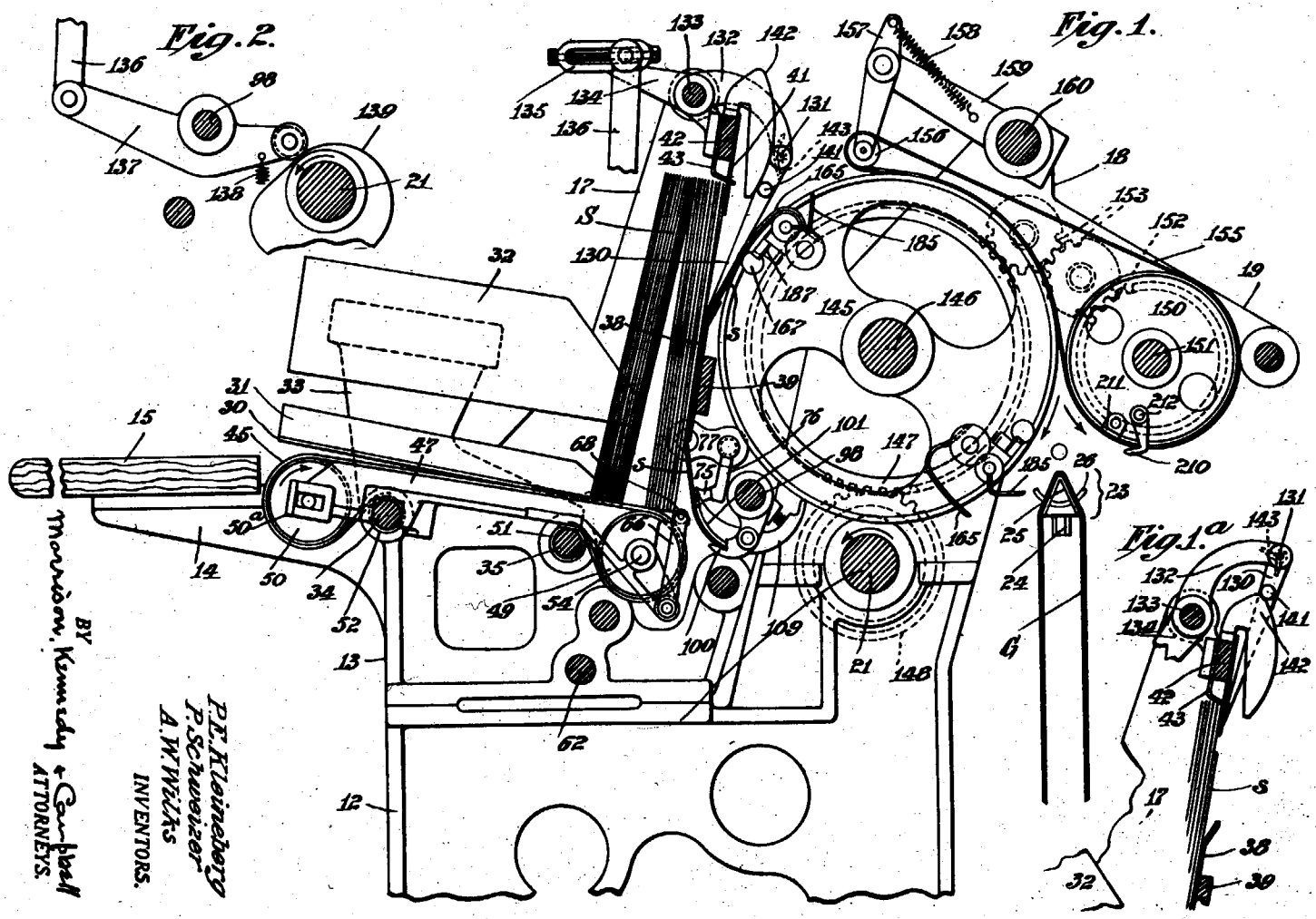
P.E. Kleineberg
P. Schweizer
A.W. Wilks
INVENTORS.
BY Morrison, Kennedy & Campbell
ATTORNEYS.

June 25, 1940. P. E. KLEINEBERG ET AL Re. 21,489

SHEET OR SIGNATURE FEEDING AND GATHERING

Original Filed Aug. 12, 1937 5 Sheets-Sheet 2

P. E. Kleineberg
P. Schweizer
A. W. Wilks
INVENTORS.

BY
Morrison, Kennedy & Campbell
ATTORNEYS.

SHEET OR SIGNATURE FEEDING AND GATHERING
Original Filed Aug. 12, 1937 5 Sheets-Sheet 3
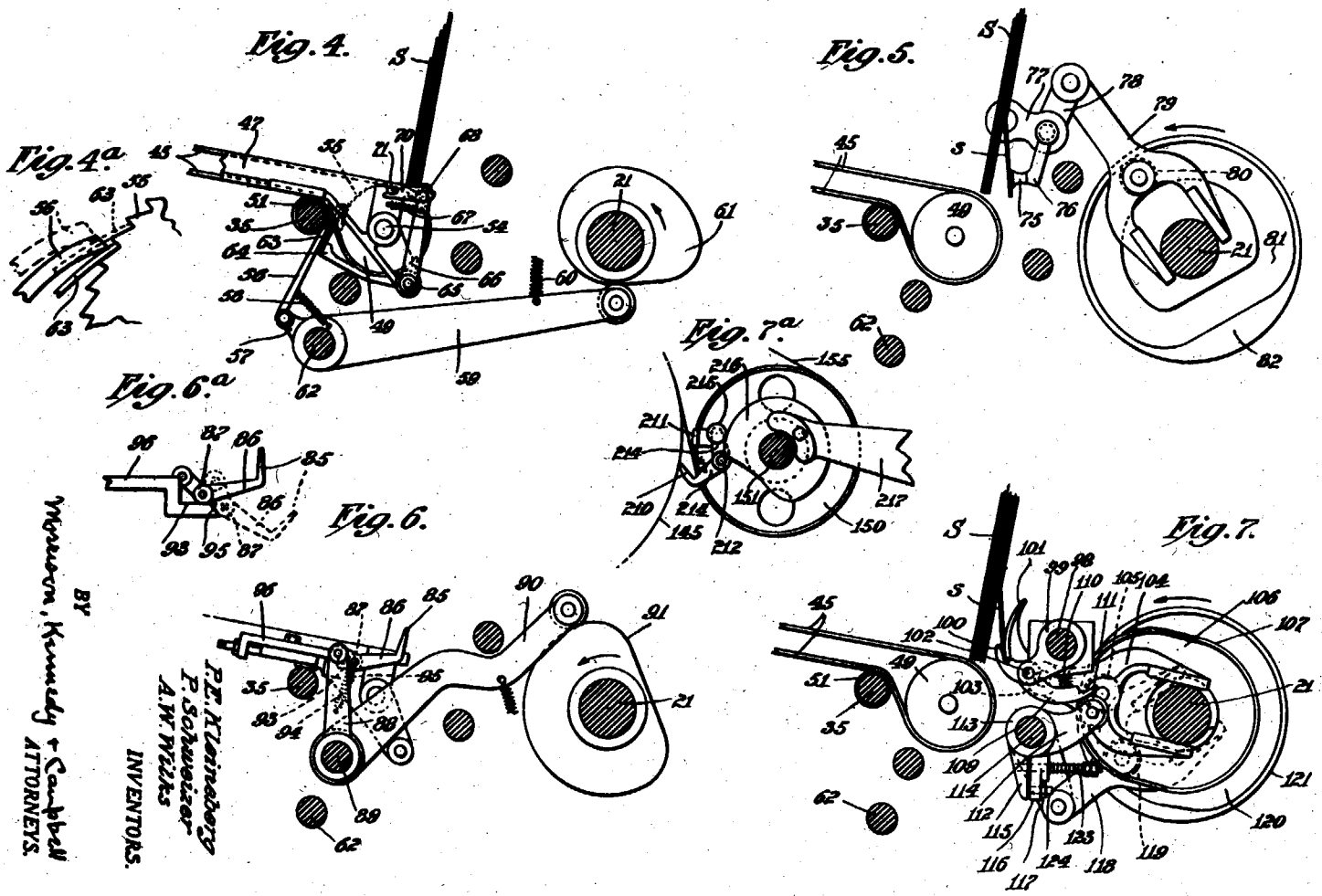
P. E. Kleineberg
P. Schweizer
A. W. Wilks
INVENTORS.
BY
Morrison, Kennedy & Campbell
ATTORNEYS.

June 25, 1940. P. E. KLEINEBERG ET AL Re. 21,489
SHEET OR SIGNATURE FEEDING AND GATHERING
Original Filed Aug. 12, 1937 5 Sheets-Sheet 4
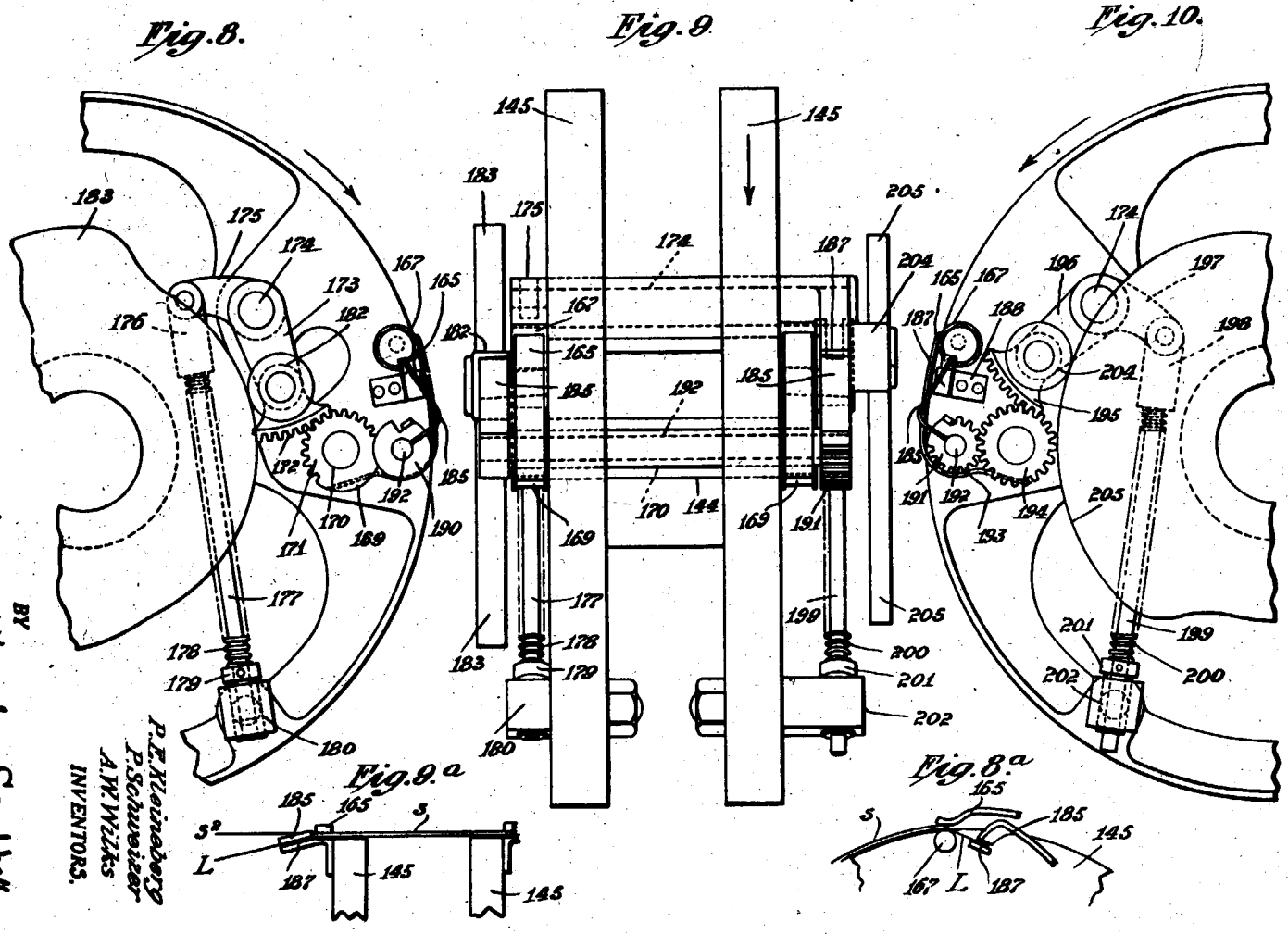
P. E. Kleineberg
P. Schweizer
A. W. Wilks
INVENTORS.
BY
Morrison, Kennedy & Campbell
ATTORNEYS.

June 25, 1940. P. E. KLEINEBERG ET AL Re. 21,489
SHEET OR SIGNATURE FEEDING AND GATHERING
Original Filed Aug. 12, 1937 5 Sheets-Sheet 5
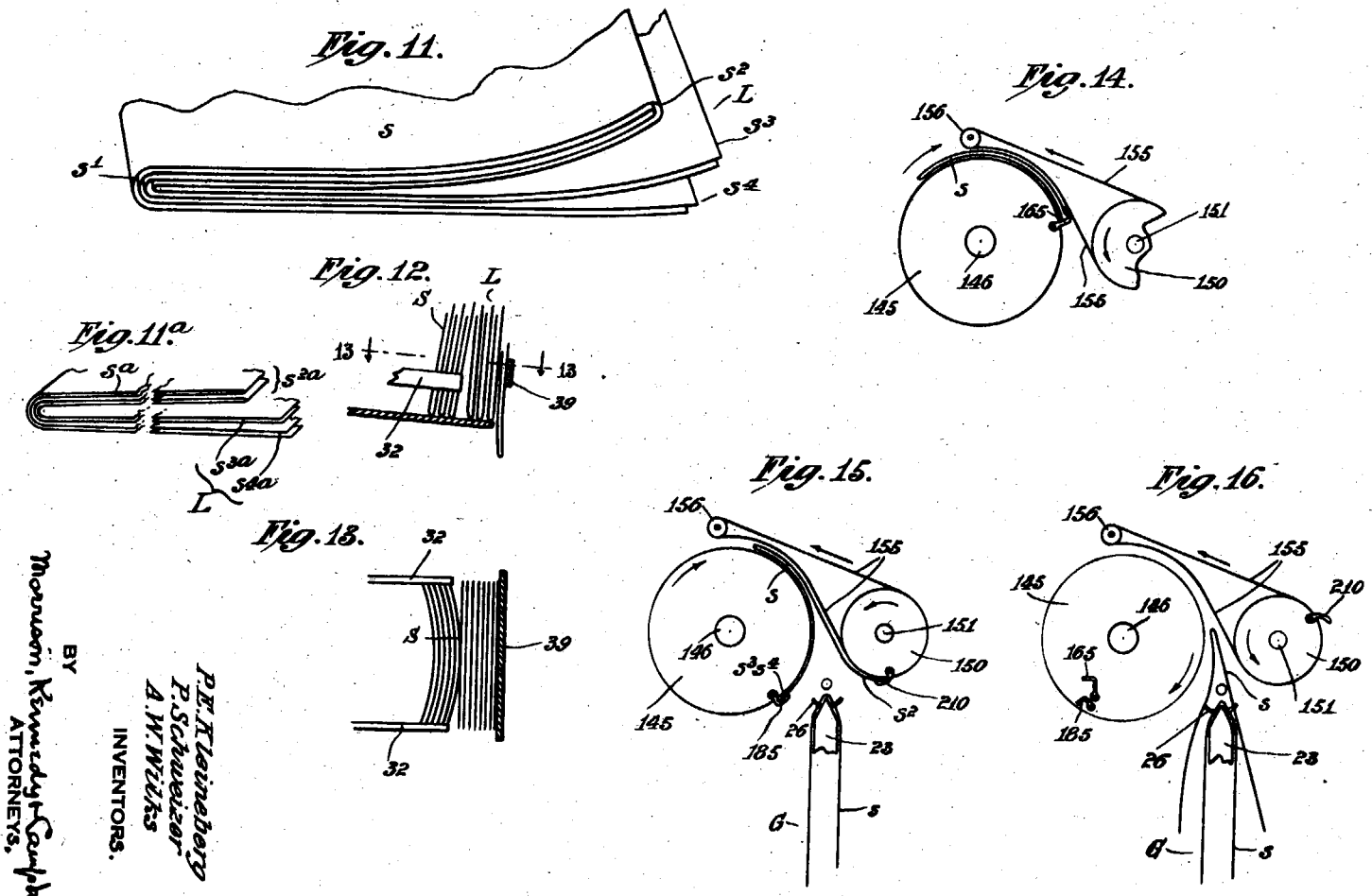
P.E. Kleineberg
P. Schweizer
A.W. Wilks
INVENTORS.
BY
Morrison, Kennedy & Campbell
ATTORNEYS.

Reissued June 25, 1940 Re. 21,489

UNITED STATES PATENT OFFICE 21,489

SHEET OR SIGNATURE FEEDING AND GATHERING

Paul E. Kleineberg, Paul Schweizer, and Andrew W. Wilks, Easton, Pa., assignors to T. W. & C. B. Sheridan Company, New York, N. Y., a corporation of New York Original No. 2,163,732, dated June 27, 1939, Serial No. 158,684, August 12, 1937. Application for reissue March 7, 1940, Serial No. 322,860

39 Claims. (Cl. 270—54)

This invention relates to sheet or signature feeding and gathering, and involves both novel apparatus and method therefor. The invention includes the handling of signatures or sheets for the feeding thereof in succession from a stack or supply hopper, and, in the case of signatures, includes the so-called insert gathering or saddle-gathering thereof, consisting in the opening up thereof during transfer from a series of stacks, and the setting or depositing of them straddlewise upon a suitable saddle of the kind having conveying or pushing means advancing the accumulating signatures along the line of stacks while a group or book is progressively built up to completion, followed by saddle-stitching or stapling through the center line.

Among the most pertinent prior art structures known to applicants are the following. In the patent of Kleineberg No. 2,082,064, of June 1, 1937, is shown an apparatus and method for outfeeding signatures or other sheets from an upright stack or pile in which the signatures lie horizontally and the pile rests on a central support, each first or bottom signature being first separated downwardly at one edge by a suction detaching device and gripped and pulled retractingly a short distance at that edge and released while still bearing on the central support and then gripped at its opposite edge and pulled advancingly out of the stack by a rotary drum and transferred away for delivery to a gatherer conveyor of the kind on which the signatures are accumulated flatwise to build up a side stitched pamphlet. Said patent shows for each stack two gripper sets around a large drum, as does Pachter patent, Reissue No. 14,560, of Dec. 10, 1918; while Kleineberg No. 2,020,321 of Nov. 12, 1935, shows a single gripper set on a smaller drum, extracting each signature and transferring it around for delivery to the traveling conveyor. Various other patents show the outfeeding of signatures from the bottom of a pile, and several of these show the transfer of signatures to a gatherer conveyor of the saddle type, with rolling means to open centrally each signature before delivery. These known mechanisms are not wholly satisfactory as to the holding and handling of the stack or the outfeeding of signatures or the transferring, opening and delivery of signatures, and it is an object hereof to improve these features and the general efficiency of operation, as well as speed or rate of operation and output.

The stack handling and signature outfeeding method and means of the present invention are of special character cooperating with the method or means for transferring, opening and depositing the successive signatures astride the saddle; and the invention includes such entire combination as well as subcombinations relating to the handling of the stack, the outfeeding of the signatures and their transferring, opening and delivery to the saddle, especially for signatures of the kind having a front extension or lap designating the center or opening place.

A particular object of the present invention is to obviate the difficulties of removing the bottom sheet or signature from a piled stack resting by gravity on a bottom support. Another object is to facilitate the adding of continued supplies to the stack. Further objects include improvement in mode of operation, reliability of action and convenience of control of the respective parts of the apparatus, including the transferring, opening and delivering means. Other objects and advantages will be explained in the hereinafter following description of an illustrative embodiment of the invention or will be understood by those conversant with the subject.

In the accompanying drawings Fig. 1 is a general left elevation view of a sheet or signature outfeeding and gathering machine embodying the present invention, with certain longitudinal parts and shafts shown in transverse vertical section, the front of the machine being considered to be at the right hand side of Fig. 1, Fig. 1[a] shows a portion of Fig. 1 with the parts in a different stage or position. Fig. 2, in similar left elevation, shows a detail of mechanism only partly appearing in Fig. 1.

Fig. 3 is a top plan view of the machine shown in Fig. 1, illustrating one complete unit or section of the machine and part of another section, it being understood that there may be an indefinite number of such sections, according to the number of hoppers or stacks of signatures desired.

Fig. 4 is a left elevation view of the mechanism for progressively advancing or feeding the stack. Fig. 4[a] corresponds with part of Fig. 4, showing feed control details on a larger scale, Fig. 5 is a similar left view of the mechanism for detaching the lower edge of the first or front signature in the stack from the succeeding ones. Fig. 6 is a similar view of the mechanism for repressing and holding back the signatures behind the first signature. Fig. 6[a] corresponds with part of Fig. 6 showing details of represser operation. Fig. 7 is a similar view of the mechanism for operating the retractor which partly pulls downwardly the first signature preparatory to its being engaged and extracted by its upper edge. Fig. 7[a] is a left elevation supplemental to Fig. 1, showing the means operating the signature opening gripper.

Fig. 8 is a left elevation of part of the signature extracting mechanism or cylinder with gripper; Fig. 9 is a front elevation thereof; and Fig. 10 is a partial right elevation thereof. Fig. 8ª is a left hand view and Fig. 9ª a bottom view, in diagram, showing the gripping action of the lap gripper.

Fig. 11 is a diagrammatic perspective view of part of a typical signature of the lap type adapted to be handled by the present invention. Fig. 11ª is a view like Fig. 11, showing another type of lap signature.

Fig. 12 is a diagrammatic elevation showing the mode of upright stacking of such signatures, with a few of them resting flatwise against the front abutment and those beyond bowed or curved in accordance with this invention, and with the first or front signature partly retracted downwardly and in readiness to be extracted upwardly. Fig. 13 is a section on the line 13—13 of Fig. 12.

Fig. 14 shows diagrammatically an extracted signature being transferred around toward delivery position; while Fig. 15 shows similarly a later position of the signature, centrally opened in advance of delivery; and Fig. 16 shows the opened signature at the moment of delivery and about to settle down upon the signatures already accumulated on the saddle below.

Figure 3:
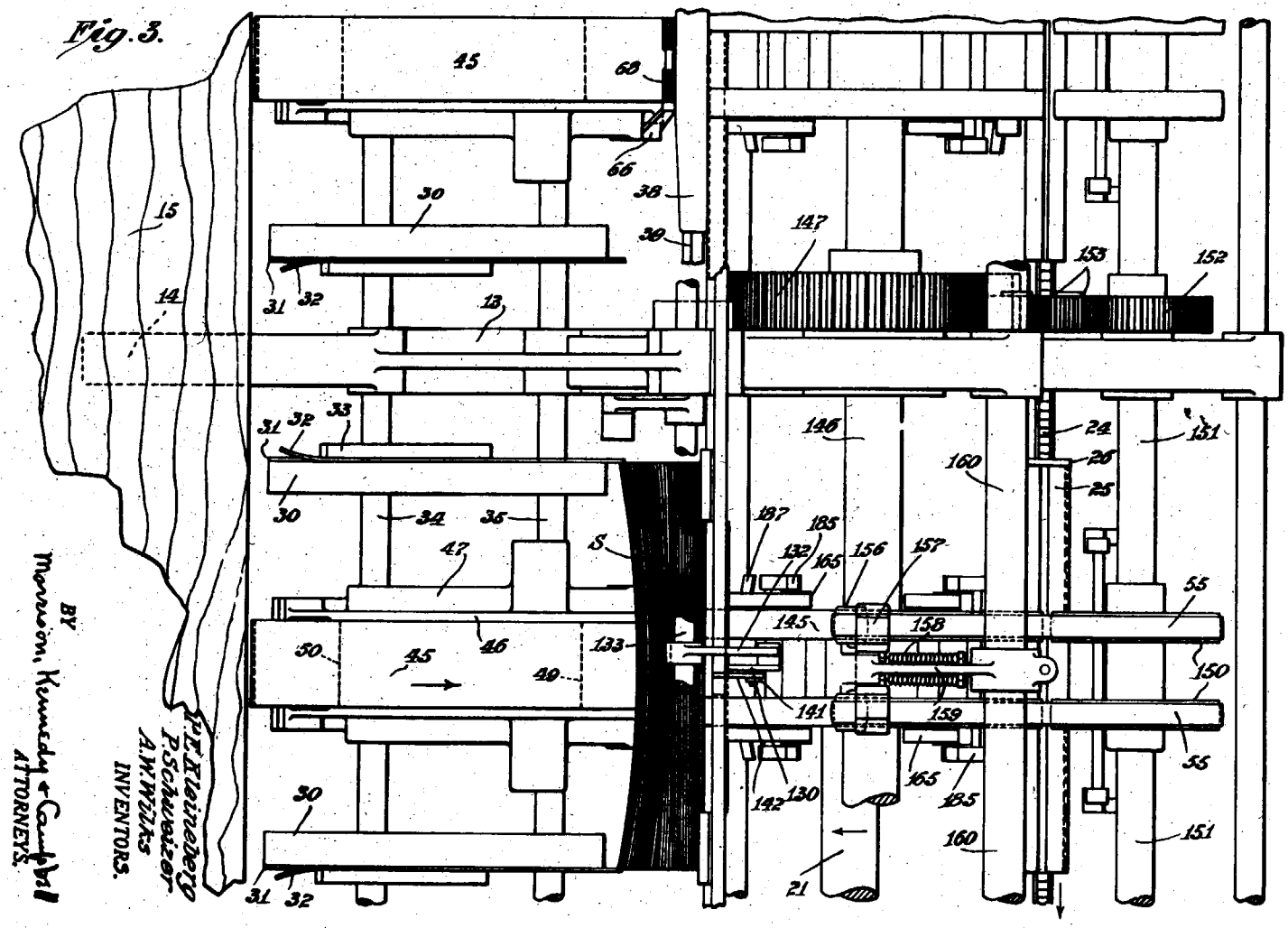

In this specification such terms as front and back, right, and left and the like are employed in a relative sense, for convenience, and are not intended as limitations as to positions, directions and the like of various parts.

The general parts of the machine include the lower frame 12 having a base or legs, not shown, and above it an upper frame 13 containing bearings for various longitudinal shafts. At the rear of the upper frame are brackets 14 on which is a loading shelf 15 arranged to support supplies of signatures in preparation for their rear loading into the respective hoppers. Various other brackets or extensions of the frame are provided for various purposes, among which may be mentioned a high rear bracket 17, a high front bracket 18 giving support to the extracting drum, and a front extension 19 thereof giving support to the opening cylinder. Beneath the extracting drum and in front of the hopper is borne the longitudinal main shaft 21, making preferably one rotation for each cycle, that is, for each signature fed from the stack to the saddle.

The saddle mechanism 23 may be of any known or conventional type. It comprises a traveling band or conveyor chain 24 upon which are mounted saddles 25, adapted to receive the opened signatures and convey them along. The chain has also outstanding pins or projections 26 at the two sides for pushing along the accumulating groups of signatures.

From the signature stack S individual signatures *s* are separated, extracted and transferred to a point above the saddle mechanism, on which they form groups G. During transfer each signature is opened up and thrust downwardly for delivery upon the saddle, in coordinated timing with the travel of the conveyor pins or pushers 26. The signature handling or movement is indicated by the diagrams Figs. 12 to 16.

The signatures are preferably of the so-called lap type, indicated in Fig. 11, the original printed sheet being so folded as to form the signature, but with one portion adjacent the center made excessively wide so as to protrude as an extension or lap L of, for example, ½ inch width. This facilitates the mechanical handling of each signature and insures its proper opening at its center before being delivered to the saddle. Fig. 11 shows the redoubled or closed back edge *s'* of the signature, and at its front or open edge, at one side, the closed half portion $s^2$, and the other half comprising portions $s^3$ and $s^4$, the portions $s^3$ being the one that is longer than the others and affords the extension L. This is merely representative, as many forms of signatures may be folded with a center lap, e. g., a simple once-folded sheet with one side or ply wider than the other, or a thicker signature with one extra wide center sheet.

A signature as an element of a book may be relatively thick or as thin as a leaflet of two plies; sometimes even a single sheet is fed into a book; therefore the word signature may be considered in a broad sense to include even a single sheet, except where it is herein otherwise described, as in having a closed or back edge or portion, or an openable edge or margin, or as being opened or saddle-gathered. So far as feeding from a hopper is concerned this is typically for gathering but may be for folding, printing or other book making operations. A signature may have a head fold, as illustrated, or may be of the kind with open head, whether because trimmed or composed of separate sheets, in which latter case its control can not be by suction but requires mechanical holding or gripping.

Having described the loading table or supply shelf 15 and the receiving and conveying saddle 23, the various mechanisms in between them will next be described in the following general order:

A. Signature hopper or stock holder, loaded from the back shelf and holding the signatures standing edgewise or upright, preferably with back edges down and openable margin or portion up and slightly inclined frontwardly, and preferably in rearwardly bowed condition, or mainly so.

B. Stack feeder, supporting the stacked signatures and progressing them frontward, either by gravity on an inclined support, or preferably by a traveling support movable under regulation toward a front abutment.

C. Signature detacher, for the first or front signature, separating its back or bottom edge or corners frontwardly away from the second signature.

D. Stack represser, operating behind the detached part of the first signature to bear against and retain the second against removal and somewhat to relieve pressure to ease removal of the first.

E. Signature retractor, grips the detached back or low edge and partially retracts or lowers the first signature and releases it, thus shifting its top edge from or below a top-edge stop or front gage that there confines the second signature.

F. Signature separator, deflects frontwardly the retracted or lowered top edge of the first signature.

G. Signature extractor, being a mechanical holder which grips the separated top edge and pulls the front signature up and out for transfer away from the hopper, preferably by the circular motion of a drum.

H. Signature opening and delivering means, comprising preferably the extracting or transfer drum and an adjacent device in the form of a rotary carrier or cylinder, cooperating for opening out the extracted signature and releasing it for deposit astride the saddle. As usual, the center signature of each pamphlet is opened and laid first on the saddle, followed by others in order and finally the outermost signature or cover, all then to be center stapled or saddle stitched and finally trimmed, which removes the laps.

*A. Signature hopper*

The signature hopper comprises certain fixed but adjustable parts. Thus, in each unit, there is a bottom plate 30 at each side receiving the sides of the back edges of the signatures, each of these bottom plates having adjacent to it a vertical plate or low wall 31. Spaced above the low side plates 31 are side guides or walls 32 between which the signatures stand edgewise forming a horizontal stack. The side guides or gages 32 are set somewhat closer together than the length of a signature, so that with thin or limber signatures, they or at least the bulk of them, take a bowed or arched posture, with concave side rearward. By this arrangement the bowed signatures are stiffened against collapse so that they readily retain their substantially upright position, being however preferably tilted slightly forwardly from the vertical as shown. With quite stiff signatures the bowing may be omitted.

The stacked signatures are thus substantially self supporting, and they require no pressing member, abutment or stop to be placed behind each added supply. This plan therefore conveniently allows each hopper to be loaded at will from the rear supply shelf without any readjustment of the mechanism. The spacing of the side walls or guides 32 may be about ½ to 1 inch less than the length of the signatures being handled, depending upon the dimensions and character of the signature and other factors. It is sufficient to produce the curving form at the lower part only of the signatures, the convexity tapering off and disappearing along the top edges which may be straight or substantially so, as shown.

By this described arrangement of signatures bowed backwardly at both ends and set substantially upright within the hopper, not only are the signatures stiffened to hold their edgewise position, but each signature thus has its center of gravity thrown substantially back of its central portion or center of area. This permits an appreciable forward incline to be given to the signatures as Fig. 1 shows without causing undue forward gravity pressure of the stack. In other words the stacked signatures remain nearly upright and lean forward only lightly and without creating substantial forward pressure on the parts in front, which condition facilitates the removing from the front of the stack of the first or foremost signature.

Referring further to the hopper side walls or guides 32, these preferably do not extend frontward to the full extent of the stack, but are terminated substantially short thereof as shown. By this special arrangement, while the most of the signatures are bowed concavely rearward as described, a substantial number of them at the front, from several to several dozen according to thickness, are released from the side walls and escape confinement and bending. In other words, in front of the point where the hopper side walls terminate, a number of signatures may stand in substantially flattened condition, bowed negligibly or not at all, being thus separated forwardly from the bulk of the signatures along the side edges, while retaining up and down contact at the middle, and the released or flattened group of several frontmost signatures being confined and held by the front hopper parts to be described.

It is believed to be novel to provide a hopper with side members, gages or walls arranged to confine edgewise-standing signatures or sheets so that they take a rearwardly concave curvature; also to abridge or terminate this stack constraining formation short of a front abutment so that several signatures at the front are free or flat and best fitted for extraction.

In each hopper there are shown, for supporting the bottom plates 30 and side plates 31 and 32 a pair of opposite carriages 33 in the form of brackets supported upon a longitudinal rod or axle 34 and in front of it a second such axle 35. The brackets may be connected adjustably to rod 34 as by split hubs. For adjustment the axle 34 may be a rotary shaft with right and left threads engaging the respective carriages 33 in each unit, so that by turning this shaft the hopper side walls are symmetrically adjustable toward and from each other to adapt them to signatures of varying lengths.

In front of the stacked signatures and approximately near but preferably somewhat below the middle of the frontmost signature is a front abutment or main stop plate 38 mounted on a stationary horizontal longitudinal bar 39, these in effect constituting the front member or wall of the hopper, but being abridged above and below to permit the detaching, retracting, separating and extracting operations to be described. The main or front abutment 38 may extend horizontally the full front width of the hopper and is shown set at a slight frontward incline from the vertical, so that the signatures assume the same incline for the reasons already explained. It receives the slight stack forward pressure at the middle of the front signature.

Above and in line with the abutment 38 is a signature top edge front stop plate 41 mounted on a longitudinal bar 42, the bar being above the top edge of the signatures but the stop plate extending down adjustably to overlap slightly and give front support to the top portion of the signature stack. The bar 42 is shown as carrying also an adjustable fixed gage or guard plate 43 overlying the top edges of the frontmost signatures, confining them vertically and ensuring that the second signature can not be shifted upwardly with the first.

Also in substantial line with the stop plate 41 and abutment 38 is a feeler member or gage 68 which registers with the front position of the lower edge of the first or front signature near its center, this member being movable and employed to regulate the feed of the stack as will be described.

*B. Stack feeder*

The signature stack S in each hopper is not fed down by gravity as in the Kleineberg patent, but must be advanced progressively frontward during operation to bring the signatures successively to extracting position. A slant might be used to cause or assist feed but controlled feed is preferred, and the following mechanism is shown.

The weight of the stack is taken upon a feed belt 46 preferably centrally arranged in each unit and operated to progress gradually frontward with the signature while their corners slide along on or above the bottom plates 38. The belt 45 may be of flexible material or fabric, and held taut to afford a firm support for the stack, and it may travel along on top of a fixed support 46. It may be corrugated or faced with rubber roughened for better traction on the signature. These and associated parts of the hopper may be mounted on a carriage 47 supported removably on the axles 34 and 35. The stack belt or band 45 may pass around front and rear pulleys 49 and 50, and it may be deflected by means of front and rear idler pulleys 51 and 52, and the slack taken up by a device 50a.

The hopper bottom belt is representative of any means to progress frontwardly the stacked upright signatures; it being a supporting member transmitting the feed action to the stack, and while a jogging feed may serve, a frontward travel is preferred.

The gradual frontward advance of the stack belt may be effected from the shaft 54 carrying the front pulley 49, as separately shown in Fig. 4, this drive mechanism being independent for each unit of the machine. The shaft 54 is mounted on the carriage 47 and carries a ratchet wheel 55 having fine teeth for short intermittent forward movements. The ratchet may be advanced by one tooth at a time by means of a pawl 56 pivoted upon a rockarm 57 and pulled toward the ratchet by a spring 58. The hub of arm 57 carries also a second arm or cam lever 59 which is pulled by a spring 60 to hold its free or following end against an open cam 61 mounted on the main shaft 21. The lever 57—59 is fulcrumed on a longitudinal axle 62.

By these drive connections each turn of the stack feed cam 61 oscillates the pawl 56 to advance the pulley 49 and belt 45, thus moving the signature stack bodily frontward. Since this movement must keep pace with the removal of signatures from the front of the stack the following feed regulating means is shown. Between the main pawl 56 and ratchet 55 is shown a guard finger or shading pawl 63, adapted to overlie a ratchet tooth and prevent engagement thereof by the main pawl, so that when the guard is moved inward the stack feed ceases. The guard is carried on an arm 64 pivoted at 65 on the carriage 47 and having an upwardly extending arm 66 pulled rearward by a light spring 67 and having at its top end a feeler or gage 68 preferably in the form of a roller over which the lower edge of the first signature may be frontwardly detached. By this device, when the stack is fed frontward, it contacts and thrusts frontwardly the lightly mounted and easily yielding feeler 68, thus thrusting the guard 63 into position and rendering inoperative the feed. The feed will resume with the removal of a few signatures.

When the hopper is empty the feeler lever 64—66 bears against the front end of the feed carriage 47.

Adjacent to these parts is shown a member 70 having an upstanding finger or hook for assisting in the operation of detaching signatures that are thin. It has no connection to the feeler but is preferably fixed to the hopper by its slotted shank and a bolt 71. Its counterpart is known in ordinary gathering machines, serving to hold back the signature behind the one being detached.

*C. Signature detacher*

Having thus completed the description of the hopper and the devices feeding the signature stack there will next be described the devices operating to remove the individual signatures and, firstly, the devices acting upon the lower edge of the front signature, commencing with the detaching or lower separating device.

The signature detacher may be of the conventional suction type similar in general to that in said Kleineberg patent. It comprises two or more suction cups 75 operating upon the front signature at its lower front edge, preferably at points near the middle of the edge and adjacent to the retracting grippers to be described. The separator hooks 70 aid this operation.

Each suction piece or detacher 75 may be mounted on a hollow arm 76 swinging on a hollow bracket 77 having pneumatic connections not shown, but timed to apply and release the suction in coordination with the back and front swinging movements of the detacher. Above the bracket 77 is an upper arm 78, see Fig. 5, to which is pivoted a link or slide 79 yoked to straddle the main shaft 21 and having a follower 80 engaging the cam groove 81 in a cam disk 82 on the main shaft. This cam in each cycle gives the necessary back and front swinging movements of the detacher at each side by which the front signature lower edge is engaged and swung frontwardly to detach it away from the second signature as shown in position to permit the stack repressing device to operate behind the detached signature and to permit the retracting device to grip and lower the signature.

*D. Stack represser*

Cooperating with the signature detacher and the retractor is a stack represser in the form of fingers 85, one at each side adjacent the signature corners, and operated as indicated in Fig. 6 to rise and enter between the detached first signature and the second signature and to thrust backwardly on the latter by a pressure sufficient to bow and stiffen somewhat the second and several subsequent signatures. The effect of this back pressure is to retain frictionally this group of signatures against tendency to retraction downward with the first signature; and this arrangement at the same time reducing the pressure or friction on the first signature and facilitating its retraction and extraction.

Each of the repressing fingers 85 is shown mounted on a lever 86 which carries a roller 87 by which the lever is swung, the lever being pivoted at the top end of an arm 88, the hub of which rocks upon a fixed axle 89 and has a frontwardly extending cam lever 90, the follower of which engages the periphery of a cam 91 on the main shaft 21. The cam effected movements therefore cause the represser lever and finger to shift backwardly and frontwardly. The roller 87 is shown resting upon a straight surface or fixed cam dwell 93 which holds the lever up and the finger in repressing position. A spring 94 holds the lever and roller down upon the dwell. Forward of the dwell is an inclined surface 95. The surfaces 93, 95 are formed on a fixed member or bracket 96. From this description it will be clear that when the cam 91 has allowed arm 90 to swing down, the arm 88 will have thrust frontwardly the lever 86 and thus cause the roller 87 to pass from the dwell surface 93 to the incline 95, thus moving forward and lowering the repressing finger to await the detaching of the next succeeding signature. As soon as another signature is detached at its lower edge the levers 86 are thrust rearward causing the two fingers 85 to rise and press rearwardly upon the signature behind the front one.

*E. Signature retractor*

The signature retractor next grips and pulls partly down by its lower edge the first signature, thus to release its top edge from the front stop 41, see Figs. 1 and 7. A rock shaft 98 carries the retracting grippers for a number or all of the hoppers. At each hopper on the rock shaft is a hub and arm 99 or a pair of them on which are mounted two grippers one at each side, to grip and retract the signature. Each gripper comprises a relatively fixed jaw 100 and a swingable or openable jaw 101. One, as 101, is shown in the form of a segment, concentric with the rock shaft. The gripper rocks bodily into the elevated position shown in Fig. 7 and down to the lowered position of Fig. 1. The movable gripper jaw or finger 101 is pivoted at 102 to the arm 99 to swing slightly between signature gripping and releasing positions. To rock the shaft 98 it is provided with a rock arm 103 actuated by a yoked link or slide 104, straddling the main shaft 21 for guidance and carrying a follower 105 engaging in the groove 106 of a cam disk 107 on the main shaft. By this arrangement the cam 106 swings the gripper bodily between signature engaging position and retracted or lowered position.

It is an advantage to have the rear jaw 100 relatively fixed and short, while the front jaw 100 is pivoted for the opening and closing and has substantial length, curved concentrically with the bodily swing of the gripper. Not only is the mechanical actuation improved by this arrangement but the signature is more reliably picked from the suction detacher.

For opening and closing the retracting gripper 100, 101, its movable jaw or finger 101 is provided, beyond its pivot, with a tail or extension 109 having an outer or lower contour substantially concentric with the gripper rockshaft 98. The gripper tail is acted upon by a spring 110 which presses the tail in a direction normally to open the jaw to a suitably limited position.

To close the gripper the concentric jaw tail 109 is shown engaged by a roller 111 carried on a lever arm 112, the hub 113 of which is mounted loosely on an axle 114, these parts so arranged that by rocking the hub and lever the gripper tail may be swung and the gripper closed or allowed to open, in any position of the gripper. Connections for closing the gripper may be as follows. Attached to the hub of arm 112 is a depending arm 115 and alongside of this is a cooperating arm 116. The arms 116 for all the hoppers may be fast on the axle 114, now acting as a rockshaft. Connected with the arm 116 or fast on the rockshaft is a rockarm 117 swung by a yoked link or slide 118 which straddles the main shaft 21 and carries a follower 119 engaged in the cam groove 120 of a disk cam 121 on the main shaft.

To cushion the gripping action and afford a yield in the gripping of each signature there is shown a strong spring 123 connecting the arms 115 and 116, tending to hold them together under the limit of a set screw or stop device 124. By this arrangement when the cam 120 swings the arms 117 and 116 to the front this acts through spring 123 to swing the lever 112 upwardly so that the roller 111 presses the tail of the gripper jaw 101 to close the gripper with moderate pressure on the signature. This yield serves the purpose of ensuring proper and equal gripping action on signatures of varying thickness along the length of the machine, all operated from the same rockshaft. It also presents excessive or destructive gripping pressure by reason of the spring cushion for each gripper.

The two cams 106 and 120 therefore determine completely the retracting gripper action, the two grippers at each hopper rising, engaging the detached lower edge of the first signature, closing upon the signature, swinging downward to retract partly the signature, and there releasing it for upward extraction by mechanism yet to be described.

The described retracting mechanism, best shown in Fig. 7 affords a signature alining or jogging action which is desirable. This is by reason of the shoulder formed at the upper side of the retracting jaw 100, against which the bottom edge of the signature is seen to contact. This shoulder is so arranged that, on each rise of the gripper 100, 101 the shoulder will always engage the bottom edge of the signature. In other words, even if the signature may be slightly too high in the hopper, nevertheless the shoulder will reach up to the signature, and a signature which is correctly positioned will thus be slightly buckled or bulged as the gripper rises to position. The result of this action is that the lower edge of the gripper is always accurately positioned for the retracting action and for all subsequent actions, and since this lower edge is the closed or back edge of the signature it follows that the signatures will be uniformly handled in their retraction, extraction, and delivery to the gathering means.

*F. Signature separator*

The next step on each signature is the separating of its upper position or deflecting it frontwardly from the second signature in preparation for extraction. There is shown a separator or finger 130 which works its way down mechanically between the top of the partly lowered first signature and the next signature in the stack. Fig. 1 shows the separating finger in its lowered position, and the signature is deflected frontwardly and actually engaged by the extracting gripper. The signature having been pulled downwardly until its top edge is free of and well below the stop plate 41, as Fig. 1[a] shows, the separator is readily able, by a light pressure against the second signature, to slide down between them as shown. When fully elevated for a new operation as in Fig. 1[a] the separator or deflector preferably has its lower edge resting upon the stop plate 41, from which it slides down in the next separating operation. A single separator near the center may suffice for effectively deflecting frontward the entire top portion of the signature to be extracted. Each hopper has such a separator.

The connections and operation of the separator 130 may be as follows. It is shown pivoted at 131 upon a movable carrier or actuating arm 132 mounted on a longitudinal rock shaft 133 supported in the frame bracket 17. Behind the rock shaft is extended a back rockarm 134 by which the swinging movements are effected. For purposes of adjustment of throw the rockarm 134 is provided with an adjustable pivot device 135 and to this is pivoted a link 136 extending downwardly to a cam lever 137, Fig. 2. A spring 138 applied to the lever 137 tends to lower the separator 130 and to hold the free end of the lever in contact with the operating cam 139 on the main shaft 21. As the pivoted upper end 131 of the separator swings up and down it is necessary that the separator should swing on its pivot under proper control. The separator is shown provided with a follower stud or roll 141 which engages a fixed cam 142 mounted on the bar 42 and of such contour that the separator's up and down movements cause the proper swinging movements. The cam 142 is preferably an open cam and a light spring 143 is provided to hold the follower to the cam, for example a coil spring at the pivot 131, affording a light rearward pressure.

The separator works in the gap between the abutment and top edge stop. It stands at a slant so that its lower edge or nose represses the second signature and readily enters behind the first, which thus is deflected frontwardly to the extractor, the upper edge of the abutment being bent to correspond.

*G. Signature extractor*

The extractor operating to pull out the first signature by its upper edge after release from the stop 41 is shown in the form of a rotary drum 145 carrying extracting grippers 165, each adapted to hold mechanically and pull upon the entire thickness of the signature. The drum is of skeleton construction, as Fig. 3 shows, consisting of two similar drum sections or disks upon or near the cylindrical peripheries of which work the extracting grippers. The shaft 146 of the drum 145 is journalled to turn in the high bracket 18. The drum is driven at uniform speed through a gear 147 carried by its shaft engaging a gear 148 on the main shaft 21. This gearing is shown in the ratio of 1 to 2, and the drum having two complete sets of grippers, at opposite points of its periphery, there is thus afforded one extracting action per cycle; but manifestly the drum could be geared 1 to 1 with a single set of grippers or 1 to 3 with three sets, etc. The grippers 165 may be operated to separate and deflect the front signature, thus acting as both separator and extractor, but for reliable operation the separator 130 also is preferred.

Of course there are to be a series of drums 145 on shaft 146, one for each hopper, and gripping, opening and associated devices for each drum; and this is to be understood in the further description.

*H. Opening and delivering means*

Before describing the actuation of the extracting grippers of the main drum it will be convenient to locate and describe generally the signature opening cylinder which is shown in the form of a revoluble carrier or auxiliary drum 150, and which also is of skeleton construction, comprising two disks turning on a longitudinal shaft 151 journalled in the bracket 19. The opening cylinder is shown one half the size of the extracting drum and it is driven at the same peripheral speed by means of a gear 152 on the cylinder shaft 151, with two idler gears 153 in train between the gear 147 and gear 152 to produce the same downward direction of peripheral movement above the saddle 23.

When the extracting drum grippers or mechanical holders 165 engage each signature the drum pulls the signature up and out of the hopper and around frontward and thence down between the drum and cylinder, to be there opened and delivered upon the saddle; see Figs. 14 to 16. To maintain each signature in firm contact upon the drum 145 during this travel there are shown endless tapes 155 passing around a substantial part of the extracting drum periphery between extracting and delivering positions, the tapes thence shifting from the drum over to the opening cylinder 150 and thence around part of the cylinder and back and around an idler pulley 156, located above the drum. In order to take up slack in the tape the puller 156 is shown mounted on a take-up lever 157 pulled by a spring 158 and mounted on a bracket 159 keyed to a longitudinal frame rod 160. The tapes constitute a holding means for the entire thickness of the signature, releasing it for delivery as the tapes pass from drum to cylinder.

While the transfer of the procession of extracted signatures may be to a more remote opening point, preferably the same drum 145 which extracts them carries them directly to a nearby place of opening and delivery, thus simplifying and condensing the apparatus; the drum carrying not only the extracting grippers 165 but mechanical means 185 to hold to it one half of each signature while the opening means diverts the other half.

The general operation of transfer of the extracted signature and its opening and delivering may be as follows. The signature travels around the drum with its top or open edge in advance, this having the lap portion L determining the middle of the signature. The half $s^3$, $s^4$ of the signature that includes the lap is inside, against the drum, and the other or closed half $s^2$ is at the outside. The extracting and transferring grippers grasp both halves, but there are also auxiliary or lap grippers engaging or holding to the drum only the lap half of the signature, and which are closed at the extraction point or between it and opening point. When each signature reaches about the point of tangency or nearest approach of the cylinder and drum the extracting grippers open to free the outer half of the signature or that which does not contain the lap, the lap gripper however continuing to hold the lap half of the signature to the drum. The next step is to engage the non-lap half of the signature on the revoluble opening cylinder, thus to open centrally the signature; this being permitted by the switch across of the tapes from the drum to the cylinder. For such purpose the opening cylinder carries a mechanical pulling device or gripper 210, or pair of them, which engages and grasps the non-lap signature half which has been released from the main drum. Thus beyond or below the point of tangency the two halves of the signature are caused to travel divergingly, held on the drum and on the carrier or cylinder by grippers 185 and 210. This action however continues preferably for only a short further travel, just long enough to start the spreading or opening action above the saddle, the grippers then releasing the signature, which is carried further by the drum and tapes and finally settles down properly upon the saddle.

The extracting drum 145 being of double diameter carries two complete sets of grippers, one set at each side of its circumference. Each set comprises a symmetrical pair of extracting grippers 165 and a symmetrical pair of lap grippers 185, each of these grippers being shown in the form of fingers or stout strips bent to shape, as shown in Figs. 1, 3 and 8 to 10. It will be noticed that each main or extracting gripper is substantially longer than or extends beyond the adjacent lap gripper, being thus enabled to reach below the top edge of each signature to an extent to grip all portions or plies as Fig. 1 shows. On the other hand the lap gripper, being relatively short, is able to engage only the lap L of the signature and thus confine only the inner or lap half of the signature to the drum. Preferably the grippers do not confine the signature directly against the peripheries of drum sections 145, but are provided with special seats located symmetrically outside of or further apart than the drum sections; the main gripper seats 167 being adjacent to the outer sides of the disks and the lap gripper seats 187 being still further outwardly, as Figs. 3 and 9 best show. A desirable distinction between the seats for the respective grippers is that the seat 167 for each main gripper 165 is located substantially in alinement with the cylindrical surface of the drum so that when each sheet is gripped between the main gripper parts 165 and 167 this is without distortion or deflection of the signature; whereas as will be explained further on Figs. 8, 8ª, 9 and 9ª, the seat 187 for the lap gripper 185 is inset substantially below the cylindrical surface, thus causing inward deflection of the inner or lap half of the signature at the location of each lap gripper, and thus producing a recess between the two halves of the signature well adapted to accommodate the gripper of the opening cylinder to be described.

Each main or extracting gripper 165 is shown as a metal strip or bar bent or curved in a shape to clear adjacent parts. The shank end of the main gripper is mounted or attached upon a rocking collar or block 169. These blocks at the two sides are symmetrically attached to a rock shaft or sleeve 170 turning in a bearing sleeve or cross member 144 constituting part of the drum. The block or collar 169 also has gear teeth 171 at its left end, thus constituting of it a pinion through which the two blocks and the shaft 170 may be oscillated, namely by a rack 172, to close and open the main gripper. The rack is shown mounted on a rockarm 173 turning loosely on a long bearing stud 174, and its hub having also a second rockarm 175 which may be thrust outwardly for closing the main gripper.

The main gripper closing is preferably performed by a cushion or spring device determining the gripper pressure, opposed by cam means for opening the gripper. For this purpose the rockarm 175 has pivoted to it a hollow member 176 constituting part of a swinging link, completed by a rod 177. A strong helical spring 178 is confined on the rod under compression between the surrounding link part 176 and at the other end a bushing or collar 179 in which slides the rod part of the link. The bushing is threaded into a socket 180 which is swivelled, thus allowing for the swinging movements of the arm 175 and link. By turning the collar 179 the spring stress and pressure is adjustable.

The spring 178 thereby effects the closing of both of the main grippers 165 through the described train of parts 176 to 169. For opening the main grippers and allowing their closing in proper timing there is shown a follower or roll 182 on the rockarm 173, this bearing against the periphery of a fixed cam or disk 183. By the shape of the cam 183 therefore, as the gripper mechanism travels around it, with the follower 182 running on the cam, it causes the gripper to open widely, and then at gripping position, as in Fig. 1, to close completely upon the top margin of the deflected signature, the gripper remaining closed until, before reaching signature opening position, the cam 183 causes it to relax or lift sufficiently to release the signature, leaving the latter held only partly by the lap gripper.

Each lap gripper 185 is adapted to cooperate with a seat 187 attached to each drum disk 145 by a fixture 188. The seat is shown inclined, extruding below the cylindrical surface of the drum, the gripper therefor depressing the lap half of the signature at the gripping places. The left gripper 185 of each set is secured to a clamp collar 190 and the right gripper to a clamp collar 191 both of these collars secured to a rockshaft 192 turning in the drum bearings outwards of sleeve 170. When the shaft is rocked the lap grippers close or open, being shown in open position in Figs. 1, 3 and 16 and in closed position in Figs. 1, 3, 8 to 10 and 15.

Preferably each lap gripper and its seat are inclined or bevelled to accommodate the bend of the signature beyond each drum disk 145, as the left and bottom view diagrams of Figs. 8ª and 9ª show. Thus the lap half L is deflected below the periphery from the seat 187 to the edge of the signature, while the non-lap half $s^2$ retains its circumferential form, making a substantial gap between the two halves to receive the opening gripper 210.

For effecting the lap gripper closing and opening movements, the right collar 191 is provided with pinion teeth 193 these engaging an idler pinion 194 which in turn is engaged by a rack 195 provided at the free end of a rockarm 196 turning on the rod or axle 174. From the hub of rockarm 196 extends a second arm 197 through which actuation is performed in part by a resilient device. Thus a hollow link part 198 is pivoted to the arm 197 and engages with a rod 199, the two constituting a swingable link, the rod being surrounded by a spring 200 and sliding in a bushing or collar 201. The spring confined between 198 and 201 tends to throw outward the arm 197 and effect the opening of the lap gripper, limited by a suitable stop. The collar 201 is threaded into a swivel socket 202. The gripper closing movements are effected through a follower or roller 204 mounted on the rockarm 196 and engaging the shaped periphery of a fixed cam or disk 205. The cam thus opposes the spring and determines the timed opening and closing actions.

The opening cylinder or gripper carrier 150 makes one rotation for each half rotation of the main drum 145. The cylinder carries a symmetrical pair of grippers 210, each cooperating with a seat 211 for the gripping of the non-lap or outer half of the signature. The two grippers 210 are mounted on a common rockshaft 212 which may be rocked to cause the closing and opening of the grippers. The grippers 210 are symmetrically positioned at points corresponding with the positioning of the lap grippers 185 on the main drum. This enables each gripper 210, in its closing movement, to reach into the recess of the deflected signature lap, thus facilitating the proper mechanical engaging or gripping of the entire thickness of the non-lap half of the signature.

The timing of the closing of the opener grippers 210 is such that they will grip the signature half at approximately the point of tangency between the drum and cylinder. The main or extracting grippers have in the meanwhile opened. The two halves of each signature are, from and beyond the tangency point, gripped and advanced respectively by the lap grippers on the main drum and the opening grippers on the cylinder. When the signature has advanced a short further distance and has been opened to about the extent indicated in Fig. 15, both the lap and opening grippers are caused to release the signature. These releases leave the open signature in a condition of descending movement, so that after further travel to delivery the signature is discharged, to be received upon the traveling saddle in advance of each pair of pusher pins thereof.

The rocking of opener gripper shaft 212 may be by connections including a spring-pressed rockarm 214 with follower 215 bearing on fixed cam disk 216, mounted loosely on shaft 151 and fixedly on bracket 217, all entirely analogous to the connections for operating the other grippers and the cam shaped to give the described timing, as the gripper and follower revolve around it.

The operation or method may be reviewed as follows. The different signature supplies are shown stacked edgewise or upright in as many hoppers or signature boxes, the signatures being preferably bowed for stiffness, except as to a few allowed to become substantially flat near the front. Each hopper is constructed for or has means causing frontward travel of the horizontal stack, and a means or abutment at the front to limit the travel, additional supplies being added at the rear at convenient intervals. At the front the successive signatures are extracted either upwardly or downwardly, through a gap above or below the abutment, for transfer and delivery. The preferred actions on each front signature are as follows, assuming upward extraction. The lower edge of the signature is detached or deflected frontward. This edge is then gripped and retracted downwardly and released. The lowered upper edge is then separated and deflected frontwardly, and it is then gripped and extracted from the hopper. These actions overlap considerably, so that one signature is extracted for each cycle or main shaft rotation. Thus the separator may commence its separating action at the upper edge while the signature is being retracted at its lower edge; and while each signature is being extracted upwardly the lower edge of the next signature may be detached for retraction, etc.

By these actions a procession of signatures is drawn out of the hopper and transferred to a delivery point, for example to a saddle-gathering means. Each signature travels from extracting to opening point, its lap half against the transfer means or drum and its openable edge leading. The extracting drum, cooperating with the transfer tape 155, constitutes the transfer means. The opening actions are as follows. Before reaching the opening point the lap gripper closes on the inner or lap half of the signature; which might occur at any time after the extracting or main grippers have gripped the signature. At or before reaching the opening point, but not before the signature is under control of the transfer tapes, the extracting grippers relax to release the outer or non-lap half of the signature. At the opening point the opening device or gripper closes upon the non-lap half, during the transfer travel, or on the run, thus with further progress acting to pull away or divert this half in a contrary direction to the continued travel of the lap half. The lap and opening grippers release the signature after the opening action is well begun, without waiting until it is finally delivered. The advancing saddle mechanism receives, in each book space, one signature per cycle, so that each group or book is built up of one of each variety of signature.

We claim:

1. A sheet or signature feeding mechanism comprising a hopper for holding a horizontal stack of signatures standing edgewise, said hopper having a supporting bottom, a front abutment against which the first or front signature bears, and side gage members or walls arranged or spaced to cause the stacked signatures to assume a rearwardly concave curvature thereby stiffening them to stand edgewise, means for feeding the stack progressively frontward as the signatures are extracted, and means to separate or deflect frontwardly each signature coming to front position and to grip and extract it from the stack for transfer to a gathering or other mechanism.

2. A mechanism as in claim 1 and wherein the abutment and signatures stand with a slight frontward slant from vertical.

3. A mechanism as in claim 1 and wherein the side gages are arranged to bow the signatures mainly near their lower portions, leaving their top edges substantially straight.

4. A mechanism as in claim 1 and wherein the hopper bottom comprises a supporting member or belt adapted to travel frontward and the stack feeding means causes such travel thereof.

5. A mechanism as in claim 1 and wherein is a feeler displaced by the advance of the front signature and thereby controlling the stack feed.

6. A sheet or signature feeding mechanism comprising a hopper for holding a horizontal stack of signatures standing edgewise, said hopper having a supporting bottom, a front abutment of less height than the signatures against which the first or front signature bears, and side gage members or walls spaced sufficiently close together to bow the stacked signatures into a rearwardly concave curvature thereby stiffening them to stand edgewise, the signature bowing portion of said gages terminating near the front thereby to release a front group of several signatures to stand flatly against the abutment, means to feed the stack progressively frontward as the signatures are extracted, and means to separate or deflect frontwardly each signature coming to front position and to grip and extract it from the stack for transfer to a gathering or other mechanism.

7. A sheet or signature feeding mechanism comprising a hopper for holding a horizontal stack of signatures standing edgewise, said hopper having at its bottom an endless supporting belt, a front abutment against which the first or front signature bears, and side gage members or walls arranged to cause the stacked signatures to assume a rearwardly concave curvature thereby stiffening them to stand edgewise, means to cause travel of said stack supporting belt to feed the stack progressively frontward as the signatures are extracted, with means to coordinate such feed with the extraction of signatures, and means operating upon each signature coming to front position to grip and extract it from the stack for transfer to a gathering or other mechanism.

8. A mechanism as in claim 7 and wherein the belt travel means includes a pawl and ratchet, and the means to coordinate the feed comprises a feeler in the path of the lower edge of the signatures, and means actuated by such feeler to render inoperative the pawl and ratchet when the stack is fed sufficiently frontward.

9. A mechanism as in claim 7 and wherein the stack-curving side gages are effectively abridged near the front to release therefrom a number of signatures that remain held edgewise between the curved signatures and the abutment.

10. A sheet or signature feeding mechanism comprising a hopper for holding a horizontal stack of signatures standing edgewise, said hopper having a supporting bottom, a front abutment against which the middle part of the front signature bears, and side gage members or walls arranged to cause the stacked signatures to assume a rearwardly concave curvature thereby stiffening them to stand edgewise, means for feeding the stack progressively frontward as the signatures are extracted, means operating upon each signature coming to front position to separate or deflect it frontwardly from the next signature, and a device arranged and operable for entering between such separated signature and the next signature behind and for at each side repressing the latter signature and those beyond thereby to retain them in the stack and to relieve the pressure on such separated front signature, to facilitate its extraction.

11. A signature feeding and gathering mechanism comprising a hopper for holding a horizontal stack of signatures standing edgewise with their closed back edges down, said hopper having a supporting bottom, a front abutment against which the middle part of the front signature bears, and side gage members adapted to cause the stacked signatures to assume a rearwardly concave curvature thereby stiffening them to stand edgewise, means for feeding the stack progressively frontward in the hopper as the signatures are extracted, means for detaching frontwardly the lower portion of each front signature from those behind, repressing means for entering behind each such detached front signature and repressing those behind it to cooperate in the retracting or extracting of the front signature, retracting means for gripping the lower edge of each detached front signature and pulling it partly down and releasing it, means for separating the upper portion of each such retracted signature from those behind comprising a separator or finger entering downwardly behind the front signature and deflecting frontwardly its upper portion, extracting means for gripping the upper edge of each such separated signature and pulling it up and out of the hopper, and means for transferring the extracted signature to a gathering mechanism.

12. A signature feeding and gathering mechanism comprising a hopper for holding a horizontal stack of signatures standing edgewise with their closed back edges down, said hopper having a supporting bottom, a front abutment against which the middle part of the front signature bears, and side gage members, means for feeding the stack progressively frontward in the hopper as the signatures are extracted, means for detaching frontwardly the lower portion of each front signature from those behind, retracting means for gripping the lower edge of each detached front signature and pulling it partly down and releasing it, means for separating the upper portion of each such retracted signature from those behind comprising a separator or finger entering downwardly behind the front signature and deflecting frontwardly its upper portion, and extracting means for gripping the upper edge of each such separated signature and pulling it up and out of the hopper.

13. A signature feeding and gathering mechanism comprising a hopper for holding a horizontal stack of signatures standing edgewise with their closed back edges down, said hopper having a supporting bottom, a front abutment against which the middle part of the front signature bears, side gage members adapted to cause stacked signatures to assume a rearwardly concave curvature thereby stiffening them to stand edgewise and a top edge stop member against which the top edge of the front signature bears, with a substantial gap between the abutment and stop member, means for feeding the stack progressively frontward in the hopper as the signatures are extracted, retracting means for gripping the lower edge of each front signature and pulling it partly down and releasing it, thus freeing the top edge thereof from said stop member, means for separating the upper portion of each such retracted signature from those behind comprising a separator or finger entering downwardly behind the front signature and deflecting frontwardly its upper portion, extracting means for gripping the upper edge of each such separated signature and pulling it up and out of the hopper, and means for transferring the extracted signature to a gathering mechanism.

14. A mechanism as in claim 13 and wherein the separator has means for raising and lowering it and means for pressing it against the second signature while lowering.

15. A mechanism as in claim 13 and wherein the separator has means for raising and lowering it and means for pressing it against the second signature while lowering, and against the stop member when raised.

16. In a signature feeding and gathering apparatus a series of hoppers each adapted to hold a horizontal stack of signatures standing edgewise and having a front abutment against which each front signature bears, in combination with mechanism for withdrawing the signatures from such series of stacks and accumulating them in advancing groups upon a traveling conveyor, said mechanism including means for separating away from each stack the edge of each of the successive signatures thereof; a continuously rotating transfer drum adjacent to each stack and having a peripheral signature gripper means thereon, timed connections for operating said gripper means to grip the separated edge of each signature and withdraw it from the stack by the rotation of the drum and to release it for delivery to the conveyor means, and movable tape means advancing with the drum periphery and signatures and operating to hold each signature in traveling contact upon the drum during the transfer including the signature travel after release by the gripper, and until final discharge from the drum for delivery to the conveyor.

17. A signature feeding and gathering machine comprising a hopper for holding a horizontal stack of signatures standing edgewise with their closed back edges down, said hopper having a supporting bottom, a front abutment against which the middle part of the front signature bears, and side gage members adapted to cause the stacked signatures to assume a rearwardly concave curvature thereby stiffening them to stand edgewise, means for feeding the stack progressively frontward in the hopper as the signatures are extracted, retracting means for gripping the lower edge of each front signature and pulling it partly down and releasing it, means for separating the upper portion of each such retracted signature from those behind comprising a separator or finger entering downwardly behind the front signature and deflecting frontwardly its upper portion, extracting means for gripping the openable upper edge of each such separated signature and pulling the signature up and out of the hopper, and means for transferring away each extracted signature for delivery upon a gathering conveyor.

18. A signature feeding and saddle-gathering machine comprising a hopper for holding a horizontal stack of signatures standing edgewise, said hopper having a supporting bottom, a front abutment against which the middle part of the front signature bears, means for feeding the stack progressively frontward in the hopper as the signatures are extracted, means for separating the openable portion of each front signature from those behind comprising a separator or finger entering behind the front signature and deflecting frontwardly its openable portion, extracting means for gripping the openable edge of each such separated signature and pulling the signature out of the hopper, means for transferring each extracted signature to a delivery point above a saddle gathering mechanism, and an opening device operable adjacent the delivery point to engage one half of the openable edge of the signature during transfer and open it away from the other half for delivery straddlewise upon the saddle.

19. A signature feeding and saddle-gathering machine comprising means for holding a supply of signatures standing edgewise, with a front abutment towards which the supply may be fed and against which the front signature bears, means for separating one entire edge portion of each front signature from those behind and gripping the full thickness of the signature at such edge and extracting such signature out of the holding means, means for transferring each extracted signature to a delivery point adjacent a gathering saddle, and an opening device adjacent the delivery point operable upon one half of the signature during transfer to divert it away from the other half thereby to open the signature for delivery straddlewise upon the saddle.

20. A signature feeding and saddle-gathering machine comprising a hopper for holding a supply of lap signatures standing edgewise with their closed edges down and their openable edges up, said hopper having a front abutment against which the front signature bears and means for feeding the signature supply progressively frontward as the signatures are extracted, means for separating the entire thickness of the upper portion of each front signature from those behind and gripping such upper portion by its entire thickness and extracting the unopened signature upwardly out of the hopper, means for transferring each such extracted unopened signature to a delivery point adjacent a gathering saddle, and an opening device located adjacent to such delivery point and there operable upon one half of the unopened signature during transfer to divert it away from the other half by the aid of the lap of the signature thereby to open the signature for delivery straddlewise upon the saddle.

21. A machine as in claim 20 and wherein the transferring means consists of a single drum in front of the hopper and having an extracting gripper adapted to engage and pull upward each signature by the entire thickness of its openable edge including the lap and to carry it over and down to the delivery point at the front side of the drum and there releases it for opening and delivery.

22. A signature feeding and saddle-gathering machine comprising a hopper for holding a supply of lap signatures standing edgewise with their closed edges down and their openable edges up, said hopper having a front abutment against which the front signature bears and means for feeding the signature supply progressively frontward as the signatures are extracted, means for separating the entire thickness of the upper portion of each front signature from those behind and gripping such upper portion and extracting the signature upwardly out of the hopper, means for transferring each such extracted signature to a delivery point adjacent a gathering saddle, and an opening device adjacent the delivery point operable upon one half of the signature during transfer to divert it away from the other half by the aid of the lap of the signature, thereby to open the signature for delivery straddlewise upon the saddle; said separating, gripping and extracting means comprising a separating finger entering downwardly between the front and next signature to deflect frontwardly the front signature, and an extracting device having a gripper to grip the deflected signature and gripper actuating means operating to pull up and out the signature.

23. A signature feeding and saddle-gathering machine comprising a hopper for holding a supply of lap signatures standing edgewise with their closed edges down and their openable edges up, said hopper having a front abutment against which the front signature bears and means for feeding the signature supply progressively frontward as the signatures are extracted, retracting means operating to grip and partly lower each signature by its closed lower edge, means for thereafter separating the entire thickness of the upper portion of each front signature from those behind and gripping such upper portion and extracting the signature upwardly out of the hopper, means for transferring each such extracted signature to a delivery point adjacent a gathering saddle, and an opening device adjacent the delivery point operable upon one half of the signature during transfer to divert it away from the other half by the aid of such lap, thereby to open the signature for delivery straddlewise upon the saddle.

24. The method of feeding of gathering sheets or signatures comprising stacking them edgewise while confining their opposite edges to cause them to bow themselves to afford vertical stiffness, and causing frontward travel of the stack with a limit thereto, and extracting vertically each front signature for transfer as to a gathering operation, and adding signature supplies to the rear of the stack as needed.

25. The method as in claim 24 and wherein the greater part of the stacked signatures are bowed for stiffness but a number at the front end are allowed to flatten, each frontmost one thereof being extracted.

26. The method of feeding or gathering sheets or signatures comprising stacking them edgewise while bowing them for stiffness, and causing frontward travel of the stack with a limit thereto, and extracting upwardly or downwardly each front signature for transfer as to a gathering operation, and adding signature supplies to the rear of the stack as needed; and wherein in each cycle, the frontmost signature is first retracted partially downwardly to displace its top edge and released and is then gripped at its top edge and extracted upwardly.

27. The method of feeding or gathering sheets or signatures comprising stacking them edgewise while bowing the stacked signatures for stiffness except for a group at the front end, and causing frontward travel of the stack with a limit thereto, and allowing such front group to flatten out and so partially separate from those to the rear, and extracting upwardly or downwardly each flattened front signature for transfer as to a gathering operation, and adding signature supplies to the rear of the stack as needed.

28. A signature feeding and gathering machine comprising a hopper for holding signatures edgewise with a frontwardly inclined front abutment against which the signatures bear and a bottom along which the signatures may shift frontwardly to the abutment, combined with a top edge stop member spaced above the abutment, and means to grip and extract each signature comprising a retractor for pulling down each signature to release its top edge from the stop member and an extractor for pulling the signature up and out by its top edge.

29. A signature gathering and saddle-stitching machine comprising a hopper for each supply of stacked signatures, a rotary drum for transferring in succession the signatures from each supply to a delivery point above a gathering saddle, said drum carrying a gripper adapted during drum rotation first to grip and extract each signature from the supply by its openable edge and thereafter to release such signature edge on the drum to permit opening and delivery to the saddle, and a signature opening means adjacent to the drum delivery point comprising a device operable during transfer to engage the outer half of the signature on the run and draw it away from the inner half and drum thereby to open the signature for delivery straddlewise upon the saddle.

30. A signature gathering and saddle-stitching machine comprising a hopper for each supply of signatures standing edgewise therein, with a front abutment against which the front signature bears, a rotary drum in front of each hopper for extracting the signatures in succession from the supply and transferring them to a delivery point above a gathering saddle, said drum carrying a gripper adapted during drum rotation first to grip each signature in the hopper by its openable edge thereby to extract it by the rotation of the drum, and thereafter to release such signature edge on the drum to permit opening and delivery to the saddle, and a signature opening means adjacent to the drum delivery point comprising a device operable during transfer to engage the outer half of the signature on the run and draw it away from the inner half and drum thereby to open the signature for delivery straddlewise upon the saddle.

31. A machine as in claim 30 and wherein the extracting and transferring drum is rotated in a direction to extract upwardly the successive signatures stacked with their openable edges up, thence to transfer each signature over frontwardly and downwardly for opening at the delivery point.

32. In an automatic signature gathering machine for extracting successive signatures from a series of supplies and transferring and delivering them straddlewise upon a saddle, a transfer and delivery mechanism for each signature supply embodying in combination, a continuously rotary drum around which each transferred signature travels with openable edge forward to the delivery point above the saddle, a mechanical holder or gripper on the drum adapted to hold the inner half only of the signature during opening, an opening device comprising a revoluble carrier or cylinder adjacent to the delivery point with drive means to revolve it continuously in coordination with the drum, a mechanical puller or gripper on the carrier adapted to engage on the run the outer half only of the signature and pull it down and away from the inner half and drum, and means for operating the holder and puller on the drum and carrier respectively to hold and engage the respective signature halves during opening, and finally to release both for discharge of the opened signature.

33. A machine as in claim 32 and wherein is an endless tape means disposed to travel around part of the drum circumference and holding the entire thickness of each signature thereon up to the delivery point, thence to switch across to the revoluble cylinder, releasing the signature, and thence around part of the circumference of the cylinder and around idlers to complete its circuit.

34. In an automatic signature gathering machine for extracting successive lap signatures from a series of supplies and transferring and delivering them straddlewise upon a saddle, a transfer and delivery mechanism for each lap signature supply embodying in combination, a continuously rotary drum around which each transferred signature travels to the delivery point above the saddle with its lap edge forward and its lap half against the drum, a mechanical holder or lap gripper on the drum adapted to hold the lap half only of the signature during opening, an opening device comprising a revoluble carrier or cylinder adjacent to the delivery point with drive means to revolve it continuously in coordination with the drum, a mechanical puller or opening gripper on the carrier adapted to engage on the run the non-lap half only of the signature and pull it away from the lap half and drum, and means for operating the holder and puller on the drum and carrier respectively to hold and engage the respective signature halves during opening, and finally to release both for discharge of the opened signature.

35. In an automatic signature gathering machine for extracting successive lap signatures from a series of supplies and transferring and delivering them straddlewise upon a saddle, a transfer and delivery mechanism for each signature supply embodying in combination, a continuously rotary drum around which each transferred signature travels to the delivery point above the saddle with its lap edge forward and its lap half against the drum, a main gripper on the drum adapted to hold the entire thickness of the signature before opening, a lap gripper on the drum adapted to hold the outer or lap half only of the signature during opening, an opening device comprising a revoluble carrier or cylinder adjacent to the delivery point with drive means to revolve it continuously in coordination with the drum, an opening gripper on the carrier adapted to engage on the run the outer or non-lap half only of the signature and pull it away from the lap half and drum, and means for operating the grippers on the drum and carrier respectively to cause the main gripper to release the signature before signature opening, the lap gripper to hold the inner half during opening, the opening gripper to engage the outer half before and hold it during opening, and finally the lap and opening grippers to release both halves for discharge of the opened signature.

36. In an automatic signature gathering machine for extracting successive signatures from a series of supplies and transferring and delivering them straddlewise upon a saddle, a transfer and delivery mechanism for each signature supply embodying in combination, a rotary drum around which each signature with its openable edge forward is transferred to the delivery point above the saddle, a mechanical holding means or gripper on the drum adapted during opening to hold the inner half of the signature in a manner to deflect inwardly below the drum circumference a portion of the forward edge of such inner half thereby to produce a recess between the inner and outer halves in position to receive an opening gripper, an opening device comprising a revoluble carrier adjacent to the delivery point with drive means to revolve it continuously in coordination with the drum, an opening gripper on the carrier adapted to enter such recess thereby to engage and grip the outer half only of the signature and to pull it away from the inner half and drum, and means for operating the holding means and gripper on the drum and carrier respectively to hold and engage the respective signature halves during opening, and finally to release both for discharge of the opened signature.

37. A machine as in claim 36 and wherein to hold the signature on the drum is an endless tape traveling around part of the drum but shifting over to the carrier, traveling partly around it and around idler pulleys back to the drum.

38. In an automatic signature gathering machine for extracting successive lap signatures from a series of supplies and transferring and delivering them straddlewise upon a saddle, a transfer and delivery mechanism for each signature supply embodying in combination, a rotary drum around which each transferred signature travels to the delivery point above the saddle with its lap edge forward and its lap half inward against the drum, said drum having a movable gripper and a depressed seat, the two adapted to cooperate during opening to hold the lap half of the signature with a portion of its forward edge bent inwardly below the drum circumference thereby to produce a recess between the lap and non-lap halves of the signature, an opening device comprising a revoluble carrier adjacent to the delivery point with drive means to revolve it continuously in coordination with the drum, an opening gripper on the carrier adapted to enter such recess of each signature between the signature halves on the drum thereby to engage and grip the non-lap half only of the signature and to pull it away from the lap half and drum, and means for operating the grippers on the drum and carrier respectively to hold and engage the respective signature halves during opening, and finally to release both for discharge of the opened signature upon a saddle.

39. In an automatic signature gathering machine for extracting successive lap signatures from a series of supplies and transferring and delivering them straddlewise upon a saddle, a transfer and delivery mechanism for each lap signature supply embodying in combination, a rotary drum around which each transferred signature travels to the delivery point above the saddle with its lap edge forward and its lap half inward against the drum, a main gripper on the drum adapted to hold the entire thickness of the signature before opening, a lap gripper and seat therefor on the drum adapted to hold the outer or lap half only of the signature during opening, said seat being located below the drum circumference whereby the gripped portion of the signature lap is bent to form a recess between the two signature halves, an opening device comprising a revoluble carrier or cylinder adjacent to the delivery point with drive means to revolve it in coordination with the drum, an opening gripper on the carrier adapted to enter such recess and engage the outer or non-lap half only of the signature and pull it away from the lap half and drum, and means for operating the grippers on the drum and carrier respectively to cause the main gripper to release the signature before signature opening, the lap gripper to hold the inner half in bent condition during opening, the opening gripper to engage the outer half before and hold it during opening, and finally the lap and opening grippers to release both halves for discharge of the opened signature.

PAUL E. KLEINEBERG.
PAUL SCHWEIZER.
ANDREW W. WILKS.